Feb. 27, 1962   J. J. PIPPENGER   3,022,794
PRESSURE REDUCING VALVE
Filed Sept. 22, 1958   2 Sheets-Sheet 2
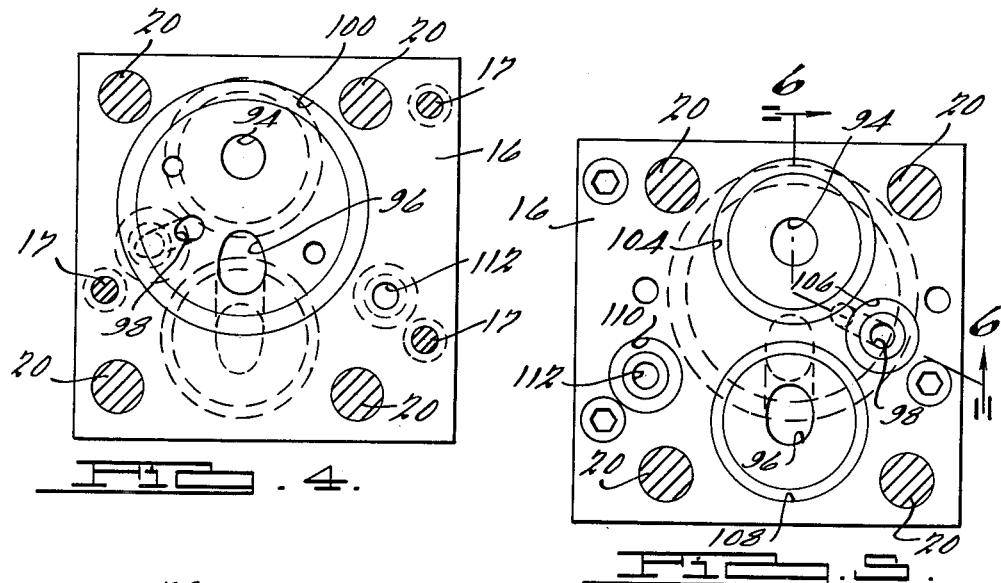
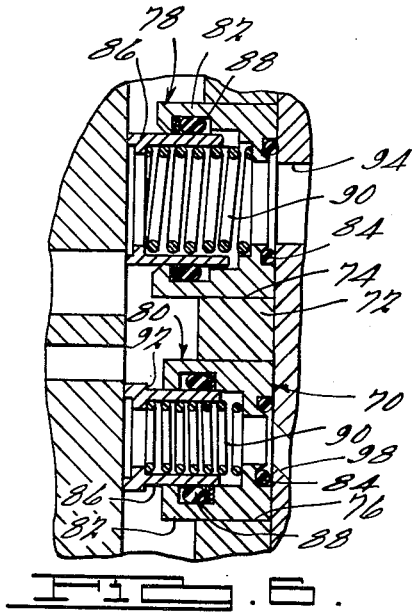
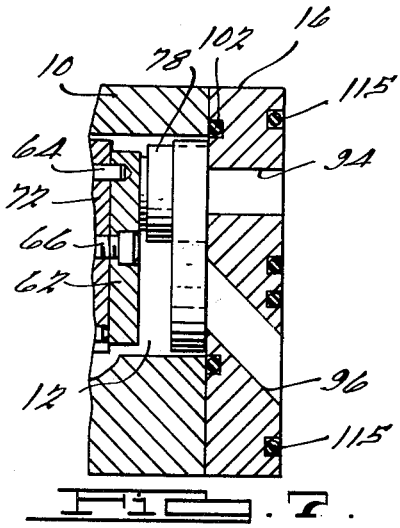
INVENTOR.
John J. Pippenger
BY
Harness, Dickey & Pierce
ATTORNEYS United States Patent Office 3,022,794
Patented Feb. 27, 1962

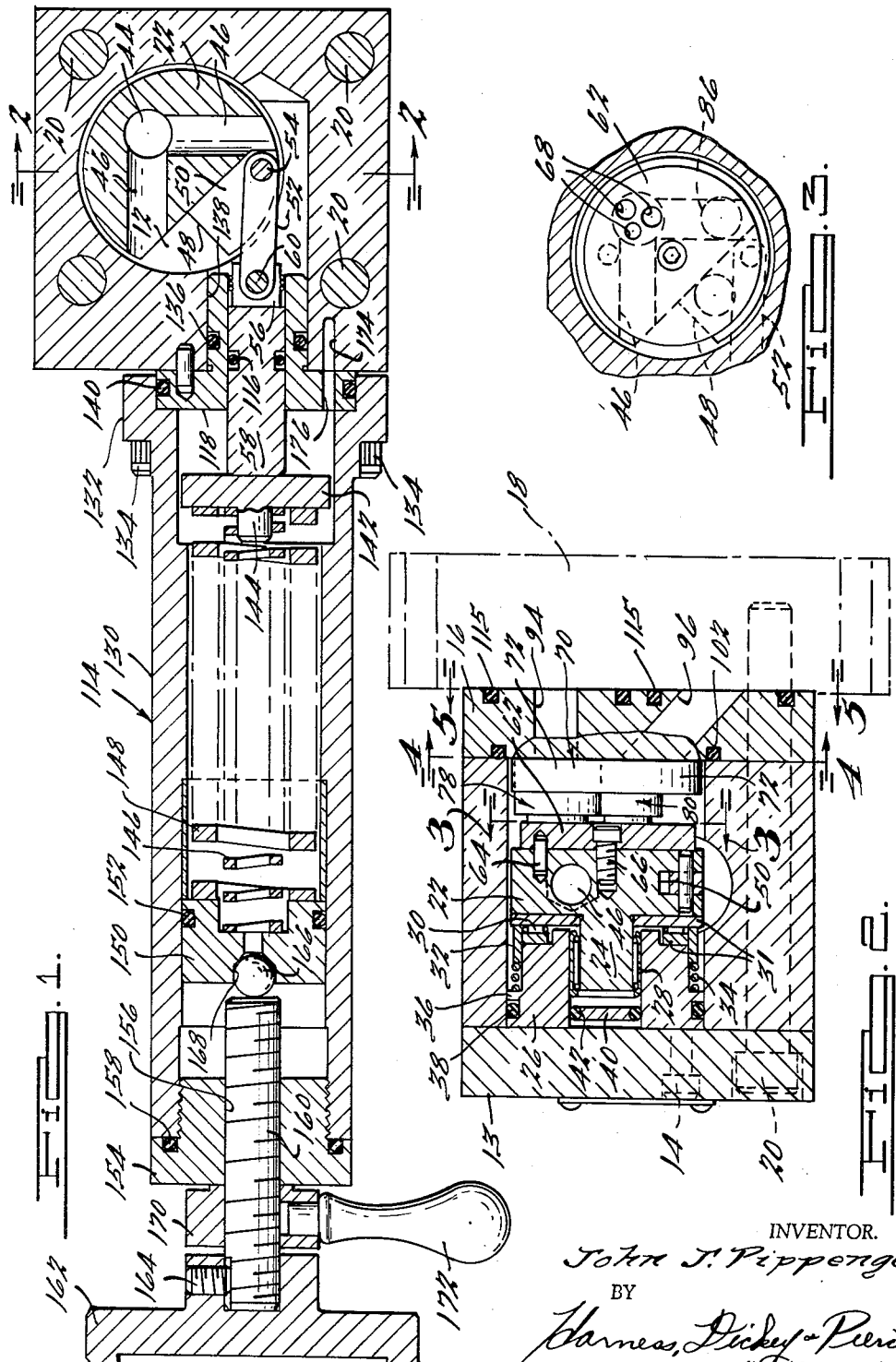

3,022,794
PRESSURE REDUCING VALVE
John J. Pippenger, Manchester, Mich., assignor to Double A Products Company, Manchester, Mich., a corporation of Michigan
Filed Sept. 22, 1958, Ser. No. 762,534
6 Claims. (Cl. 137—116.3)

This invention relates to pressure reducing valves and particularly to a pressure reducing valve that can be subjected to relatively high inlet pressures without leaking.

The maximum fluid pressure at which conventional pressure reducing valves can be operated is limited by the leakage within the valve due to manufacturing tolerances and the like. Consequently, most pressure relief valves are limited to maximum inlet pressures in the neighborhood of approximately 1500 p.s.i. and require special drain lines to carry off the leakage within the valve.

In applications, such as for use in submarines, leakage within the valves cannot be tolerated since the valve is generally connected to an accumulator and such leakage would require the submarine pumping units to operate more frequently to maintain the charge of the accumulator at the desired pressure. Since there are long periods under combat conditions when submarines are being hunted by ships using sound detecting equipment, it is obvious that the pumping units cannot be operated to charge the accumulators during such periods. Yet the accumulators must retain their charge in order to be able to provide immediate pressures at predetermined magnitudes at all times. Therefore, a non-leaking pressure reducing valve is required for submarine applications to prevent the accumulator charge from being dissipated through leakage and thus obviate the need for operating the pumping units when the submarine is subject to detection by enemy ships.

In other applications, such as in oil well digging operations, relatively large fluctuations in the volume of pressurized fluid required are encountered. The simplest and most economical way to meet such large volume demands with accumulators is to charge the accumulator to a higher pressure so that it will hold a greater volume of fluid. However, as previously stated, conventional pressure reducing valves cannot withstand pressures in excess of approximately 1500 p.s.i. and, therefore, rather than charging one accumulator to a higher pressure additional accumulators charged to a maximum of 1500 p.s.i. must be provided to provide the required fluid volume when employing conventional reducing valves. This, of course, multiplies the number of valves and other equipment needed in addition to multiplying the number of accumulators needed.

Consequently, in such an application, it would be very desirable to have a pressure reducing valve that could be subjected to higher inlet pressures of approximately 3000 p.s.i., for example, so that the charging pressure of each accumulator could be increased to reduce the number of accumulators required.

Therefore, it is one object of the invention to provide a pressure reducing valve that can be subjected to relatively high inlet pressures without leaking.

It is another object of the invention to provide a pressure reducing valve which is analogous to a two-way valve in that it permits pressurized fluid to freely pass therethrough when the outlet pressure is relatively low and which progressively seals off the high pressure inlet port as the outlet pressure increases, the inlet port being completely sealed off when the outlet pressure reaches a predetermined value.

It is a further object of the invention to provide a pressure reducing valve having a built-in pressure relief valve for preventing the outlet pressure from exceeding a predetermined value.

It is a still further object of the invention to provide a pressure reducing valve having means thereon for selectively controlling the maximum outlet pressure that can be obtained, and having a built-in pressure relief valve which automatically functions at pressures proportional to the maximum outlet pressure of the reducing valve to prevent the outlet pressure from exceeding the maximum pressure selected.

It is a still further object of the invention to provide a pressure reducing valve wherein the outlet pressure can be varied over a wide range and wherein the variation of the maximum outlet pressure can be remotely controlled.

Other objects, features and advantages of the present invention will become apparent from the following detailed description taken in conjunction with the accompanying drawings, in which:

FIGURE 1 is a sectional view of a pressure reducing valve embodying features of the present invention;

FIG. 2 is a sectional view taken along the line 2—2 of FIG. 1;

FIG. 3 is a sectional view taken along the line 3—3 of FIG. 2;

FIG. 4 is a sectional view taken along the line 4—4 of FIG. 2;

FIG. 5 is a sectional view taken along the line 5—5 of FIG. 2;

FIG. 6 is an enlarged fragmentary sectional view of the seal seats taken along the line 6—6 of FIG. 5; and FIG. 7 is a broken sectional view of a modification of the valve illustrated in FIG. 2.

Referring to FIGS. 1 and 2, a valve embodying features of the present invention is comprised of a valve body 10 having an enlarged chamber 12 therein. A cover plate 13 is fastened thereto by suitable bolts 14 or the like and a bottom plate 16 is fastened to the other end of the body by suitable bolts 17 to enclose the chamber 12 within the body. A subplate 18 (illustrated in dotted and dash lines) may be bolted to the bottom plate 16 by suitable elongated bolts 20 or the like extending through the cover plate 13, body 10 and bottom plate 16 for a purpose which will be described in greater detail hereinafter.

A disc-shaped ported plate 22 having a depending hub portion 24 is rotatably mounted within the chamber 12 by a bushing 26. It will be observed that the hub portion 24 is rotatably positioned within the bore of the bushing 26 by needle bearings 28 and that suitable roller bearings 30 are disposed between the end of the bushing 26 and the adjacent face of the ported plate 22 to eliminate the friction therebetween when the ported plate is forced against the end of the bushing 26 by fluid pressure within the chamber 12, as will be described in greater detail hereinafter. Washer-shaped bearing plates 31 are provided on either side of the roller bearings 30 to reduce wear on the ported plate 22 and the end of the collar 26. A retaining ring 32 is disposed about the roller bearings 30 and a spring 34 is disposed between the retaining ring 32 and an annular flange 36 on the left end of the collar 26, as viewed in FIG. 2, to urge the ported plate 22 and collar 26 in opposite directions.

An O-ring 38 is positioned within an annular groove in the annular flange 36 for slidably bearing against the wall of the chamber 12 to prevent pressurized fluid from leaking therepast and a disc 40 having an O-ring 42 disposed thereabout is positioned within the bore of the collar 26 to prevent pressurized fluid from escaping therepast. In this manner, the O-rings 38 and 42 prevent pressurized fluid from escaping out of the chamber 12 by passing between the cover plate 13 and the body 10.

As most clearly illustrated in FIG. 1, which is a section through the ported plate 22, the ported plate has a port 44 opening on the right face thereof, as viewed in FIG. 2, which communicates with generally radially outwardly extending ports 46 which in turn communicate with the chamber 12. A notch 48 and a slot 50 are cut into the periphery of the ported plate 22 with the slot extending from one side of the notch between the faces of the ported plate. A link member 52 has one end thereof pivotally connected within the slot 50 by a pin 54 and the other end thereof pivotally connected within a slot 56 on the end of a piston 58 by a pin 60. With this construction, the ported plate 22 can be rotated through a limited angle by the reciprocation of the piston 58, as will be described in greater detail hereinafter.

A ported disc 62 is positioned on the right face of the ported plate 22, as viewed in FIG. 2, by a dowel pin 64 or the like, and is bolted thereto by a bolt 66 or the like. As most clearly illustrated in FIG. 3, the ported disc 62 has three relatively small triangularly spaced ports 68 extending therethrough, each of which is aligned with the port 44 of the ported plate 22.

As most clearly illustrated in FIGS. 2 and 6, a seal seat assembly 70 is disposed between the ported disc 62 and the bottom plate 16 and is briefly comprised of a retaining ring 72 fixed to the bottom plate 16 having two spaced holes 74 and 76 therein. Two telescoping sleeve assemblies 78 and 80 are positioned within each of said holes, respectively, with one end bearing against the bottom plate 16 and the other end bearing against the ported disc 62.

Each of the telescoping sleeve assemblies comprises an outer sleeve 82 having an O-ring 84 disposed within an annular groove on the end thereof bearing against the bottom plate 16 to provide a seal therebetween, and a sleeve 86 slidably disposed within the sleeve 82. An O-ring 88 is disposed between each pair of sleeves to provide a sliding seal therebetween and a spring 90 is also disposed between internal shoulders on each pair of sleeves to urge them apart so that the ends thereof bear against the faces of the bottom plate 16 and ported disc 62. Telescoping sleeve assemblies of this type are completely described and claimed in a copending application of James W. F. Holl, Serial No. 352,675, filed on May 4, 1953, now Patent No. 2,832,561 and assigned to the assignee of the present invention and reference is made to the copending application for a more detailed description of such telescoping sleeve assemblies.

It will be observed that the differential areas of the telescoping sleeve assemblies which are exposed to fluid pressure either inside or outside thereof are such as to bias each of the sleeves against their respective faces with a force in addition to that provided by the springs 90 for urging the sleeves against their respective faces. It will further be observed that the sleeve 86 of the telescoping sleeve assembly 80 has an annular shoulder 92 formed on the outer surface thereof so that it is urged against the face of the ported disc 62 when exposed to pressurized fluid within the chamber 12 only as will be described in greater detail hereinafter.

The bottom plate 16 has three ports extending therethrough, an inlet port 94 aligned with the telescoping sleeve assembly 78, an outlet port 96 which is not aligned with either of the telescoping sleeve assemblies but does communicate with the chamber 12, and a pressure relief port 98 which is aligned with the telescoping sleeve assembly 80. These ports are most clearly illustrated in FIGS. 4 and 5, and it will be observed that the face of the bottom plate 16 illustrated in FIG. 4 has an annular groove 100 therein about the ports 94, 96 and 98 for receiving an O-ring 102, as illustrated in FIG. 2, to provide a seal between the bottom plate and body 10, and that the face of the bottom plate illustrated in FIG. 5 is provided with four annular grooves 104, 106, 108 and 110 about each of the ports 94, 98, 96, and a drain port 112, respectively. The drain port 112 extends through the bottom plate 16 for a purpose which will be described in greater detail hereinafter.

Suitable O-rings 115 are disposed within each of the annular grooves 104-110 to provide a fluid-tight seal around each of these ports between the abutting faces of the subplate 18 and bottom plate 16. With this construction, the subplate 18 can have suitable conduits connected thereto with suitable ports extending therethrough and communicating with the ports extending through the bottom plate 16 to direct fluid under pressure into and out of the chamber 12. Such a subplate is conventional and, therefore, it is not believed to be necessary to describe it in greater detail.

In operation, the ported disc 62 is normally positioned by the piston 58 and link 52 so that the three ports 68 are completely aligned with the sleeve 86 of the telescoping sleeve assembly 78. Consequently, when the valve is connected in a suitable hydraulic system, fluid under pressure will pass through the subplate 18, into inlet port 94 in the bottom plate 16, through the telescoping sleeve assembly 78, ports 68, port 44 and ports 46, into the chamber 12 in the valve body 10, and thence from the chamber through the outlet port 96 and the subplate 18 to a device to be operated by the pressurized fluid, such as a hydraulic cylinder or the like.

As the device demands greater fluid pressure for its operation, the fluid pressure within the chamber 12 increases and acts upon the exposed face of the piston 58 to force it outwardly of the body 10, suitable resilient means 114 being provided for resisting the outward movement of the piston 58, as will be described in greater detail hereinafter. It will be observed that an O-ring 116 is disposed within an annular groove about the piston 58 so as to slidably bear within the bore of a collar 118 disposed in a bore 138 in the wall of the body to prevent the pressurized fluid from escaping from the chamber 12.

As the piston 58 moves outwardly against the resistance of the resilient means 114 in response to the increasing fluid pressure within the chamber 12, the ported plate 22 is rotated in a clockwise direction, as viewed in FIG. 1, by virtue of the connection provided by the pivoted link 52, to gradually move the ports 68 out of alignment with the sleeve 86 of the telescoping sleeve assembly 78. At a predetermined maximum pressure determined by the magnitude of the resilient means 114, the piston 58 moves the ports 68 completely out of alignment with the sleeve 86, at which time the entire end of the sleeve 86 seats against the face of the ported disc 62 to completely seal off the inlet port 94.

In this position, of course, the greater the inlet pressure the greater the force with which the ends of the sleeves 86 and 82 of the telescoping sleeve assembly 78 are urged against the faces of the ported disc 62 and bottom plate 16 since, as previously explained, the differential areas exposed to the fluid pressure are such as to self-bias the sleeves against their respective faces.

As the fluid pressure within the chamber 12 decreases in response to the demand by the device to be operated by the fluid pressure, the piston 58 is urged back into the body by the resilient means 114 which rotates the ported plate 22 in a counterclockwise direction as viewed in FIG. 2 to gradually bring the ports 68 into alignment with the telescoping sleeve assembly 78 and inlet port 94. By providing three ports 68 rather than one larger port, the unbalancing force exerted on the sleeve 86 of the sleeve assembly 78 by virtue of the fluid pressure acting on the end thereof overlying the ports is minimized to reduce the possibility of the seal seat "popping" under the fluid pressure, that is, cocking or lifting upwardly to break the seat between the end of the sleeve 86 and the face of the ported disc 62. This feature is completely described and claimed in a copending application of Ronald L. Loup, Serial No. 775,849, filed on November 24, 1958, and assigned to the assignee of the present invention and reference is made to this copending application for a more detailed explanation of the operation and advantages of the three ports 68 as compared with one port.

With a valve of this construction having the telescoping sleeve assembly 78 acting on the rotating ported disc 62, it is apparent that a superior seat is provided as compared with prior art pressure reducing valves which enables greater inlet pressures to be used without leakage within the body. Therefore, the valve of the present invention is pre-eminently suited for use in connection with applications requiring higher inlet pressures wherein the inlet port must be completely sealed off without leakage when the outlet port reaches its predetermined maximum pressure.

When using pressure reducing valves of the prior art type, a separate pressure relief valve is generally provided somewhere in the hydraulic system between the outlet port and the device to be operated by the pressurized fluid to prevent the possibility of the pressure acting on the device exceeding the predetermined maximum amount desired. Such an increase in outlet pressure can be due to any number of reasons in connection with the operation of the device, and independent of the operation of the valve.

The valve of the present invention eliminates the need of a separate pressure relief valve being employed in the hydraulic system by providing the telescoping sleeve assembly 80 aligned with the pressure relief port 98 in the bottom plate 16. As the ported disc 62 rotates in a clockwise direction, as viewed in FIGS. 2 and 3, in response to increasing fluid pressure within the chamber 12, it moves the port 68 out of alignment with the telescoping sleeve assembly 78 as previously described toward the telescoping sleeve assembly 80, the position of the sleeve 86 of the telescoping sleeve assembly 80 being shown in dotted lines in FIG. 3.

When the fluid pressure within the chamber 12 reaches the predetermined maximum outlet pressure desired, the ports 68 move completely out of alignment with the telescoping sleeve assembly 78 and completely seal off the inlet port as previously described. However, should the outlet port pressure increase, the fluid pressure within the chamber 12 will also increase which rotates the ported disc 62 further in a clockwise direction to bring the ports 68 into alignment with the sleeve 86 of the telescoping sleeve assembly 80 and consequently the pressure relief port 98, the subplate 18 having a port therein and conduits attached thereto for connecting the relief port directly to the tank.

Thus, by the simple expedient of providing an additional port in the bottom plate 16 and an additional telescoping sleeve assembly, the hydraulic system is protected against excess of pressures being applied to the device to be operated without the necessity of providing a separate additional pressure relief valve. Further, the maximum pressure provided by the valve of the present invention can be easily varied, as will be described in greater detail hereinafter, by varying the resistance of the resilient means 114, and it is apparent that the pressure at which the relief port 98 is aligned with the ports 68 will inherently vary in proportion to the maximum pressure at the outlet port. In contrast to this, when a separate pressure relief valve is provided as in prior art systems, and the outlet pressure of the pressure reducing valve is varied, the separate relief valve will, of course, have to be independently varied or changed if its operation is to be correlated with the new outlet pressure.

Of course, as most clearly illustrated in FIG. 7, the pressure relief port 98 and the telescoping sleeve assembly 80 can be eliminated, so that only the telescoping sleeve assembly 78 is provided and aligned with the inlet port 94, as previously described. With this modification, the ported disc 62 would be rotated in response to increasing fluid pressure within the body 10 as previously described to move the port 68 out of alignment with the telescoping sleeve assembly 78 to seal off the inlet port at the predetermined maximum outlet port pressure desired, however, no provision would be provided within the valve itself for relieving pressures in excess of this predetermined amount since the telescoping sleeve assembly and relief port 98 are eliminated.

Referring to FIG. 1, the resilient means 114 which together with the piston 58 provides a pressure responsive means for rotating the ported plate 22 can be any suitable design, but in the preferred embodiment illustrated it comprises a cylindrical housing 130 having a radially enlarged hub 132 on the right end thereof which fits over the flange on the left end of the collar 118 and is fastened to the body 10 by bolts 134 or the like. In this manner, the collar 118 is also secured to the body 10 and a suitable O-ring 136 is positioned between the hub of the collar and the bore 138 in the body 10 to provide a fluid tight seal therebetween. An O-ring 140 is also provided between the flange of the collar 118 and the enlarged hub portion 132 of the cylindrical housing 130 to prevent any fluid that may escape past the O-ring 116 and into the cylindrical housing 130 from escaping from the housing 130.

A disc-shaped head 142 having a pilot portion 144 projecting from the left face thereof is positioned within the cylindrical housing 130 and urged against the left end of the piston 58 by a pair of coaxially disposed springs 146 and 148, the other ends of the springs bearing against a piston 150 slidably disposed within the cylindrical housing 130 and carrying an O-ring 152 on the periphery thereof to seal against the wall of the cylindrical housing.

A suitable end cap 154 having an internally threaded bore 156 therethrough is screwed within the end of the cylindrical housing 130 with an O-ring 158 thereon engaging the end of the cylindrical housing 130 to further prevent any fluid from escaping from the housing. A threaded stud 160 is screwed into the internally threaded bore 156 and has a knob 162 fixed to the left end thereof by a set screw 164 or the like to enable the stud 160 to be advanced against a ball 166 disposed within a suitable recess 168 in the left face of the piston 150 to vary the resistance of the springs 146 and 148 to the movement of the piston 58 to the left in response to increasing fluid pressure within the chamber 12 of the valve body 10. A jam nut 170 is positioned on the threaded stud 160 between the knob 162 and the end cap 154 and has a handle 172 fixed to and projecting therefrom for rotating the jam nut 170. With this construction, the knob 162 can be rotated to obtain the desired compressive force in the springs 146 and 148, and the handle 172 may be rotated to urge the jam nut 170 against the end cap 154 to lock the stud 160 in the desired position.

In operation, as the fluid pressure within the chamber 12 increases, it acts on the right end of the piston 58 to urge it outwardly of the body 10 to the left as viewed in FIG. 1, which movement is resisted by the compressive force of the springs 146 and 148. Consequently, the fluid pressure within the chamber 12 necessary to completely move the ports 68 out of alignment with the sleeve 86 of the telescoping sleeve assembly 78 and the inlet port 94, is determined by and substantially equal to the compressive force of the springs 146 and 148 at this point, and this, in effect, determines the maximum outlet port pressure obtainable as previously described. To vary the maximum outlet pressure, the handle 172 is merely actuated to release the jam nut 170 to permit the stud 160 to be moved either to the left or to the right by the rotation of the handle 162. This decreases or increases the resistance supplied by the springs 146 and 148 to the movement of the piston 58 which in turn decreases or increases the maximum outlet pressure obtainable.

Referring to FIGS. 4 and 5, as well as FIG. 1, the drain port 112 in the bottom plate 16 communicates with a suitable port 174 in the body 10, a portion of which is shown in FIG. 1, which in turn communicates with an axially extending port 176 in the flange of the collar 118. In this manner, any fluid that may leak past the O-ring 116 between the piston 58 and the collar 118 and into the cylindrical housing 130 can be carried off through the ports 176, 174 and out the drain port 112 which may be connected to the tank by the subplate 18.

Further, if desired, advantage may be taken of the drain port 112 to introduce fluid under pressure into the cylindrical housing 130 for increasing the resistance of the resilient means 114 to the movement of the piston 58 to the left, it being apparent that the area of the right face of the head 142 exposed to the fluid, as illustrated in FIG. 1, is less than the area of the left face of the head exposed to the fluid so that the head will be self-biased to the right by fluid under pressure introduced into the cylindrical housing 130. In this manner, the pressurized fluid introduced through the drain port 112 can serve as a pilot pressure to permit both the maximum outlet pressure of the valve and the pressure at which the pressure relief valve functions to be remotely controlled.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A fluid pressure reducing valve comprising a body having a chamber with an inlet port and an outlet port and a pressure relief port each communicating with said chamber, port means within said chamber selectively alignable with said inlet port and said pressure relief port, said port means when aligned with said inlet port permitting fluid to freely pass from the inlet port into and through the chamber and out the outlet port, said port means when aligned with said pressure relief port permitting fluid to freely pass therethrough from said chamber, and pressure responsive means for moving said port means from a position wherein it is aligned with said inlet port to a position wherein it is aligned with said pressure relief port in response to increasing fluid pressure in said chamber, said port means moving through an intermediate position between said inlet port and pressure relief port wherein it is completely out of alignment with both said inlet port and said pressure relief port.

2. The subject matter as claimed in claim 1 including seal seat means disposed between said inlet port and port means and between said pressure relief port and port means for completely sealing off said inlet port and pressure relief port when said port means is moved out of alignment therewith by said pressure responsive means.

3. A fluid pressure reducing valve comprising a body having a chamber with an inlet port and an outlet port and a pressure relief port each communicating with said chamber, disc means rotatably mounted within said chamber and having a passageway extending therethrough communicating with the opposite faces thereof and alignable with said inlet port and pressure relief port, seal seat means disposed between said inlet port and one face of said disc means to completely seal off said inlet port when said passageway is not aligned therewith, seal seat means disposed between said pressure relief port and said one face of said disc means to completely seal off said pressure relief port when said passageway is not aligned therewith, and rotating means for rotating said disc means from a position wherein said passageway is aligned with said inlet port to a position wherein said passageway is aligned with said pressure relief port in response to increasing fluid pressure in said chamber, said passageway moving through an intermediate position between said inlet port and pressure relief port wherein it is completely out of alignment with said inlet port and pressure relief port.

4. A fluid pressure reducing valve comprising a body having a chamber with an inlet port and an outlet port and a pressure relief port each communicating with said chamber, discs means rotatably mounted within said chamber and having a passageway extending therethrough communicating with the opposite faces thereof and alignable with said inlet port and pressure relief port, said inlet, outlet and pressure relief ports communicating with a wall portion of said chamber substantially parallel to and spaced from one face of said disc means, a first telescoping sleeve assembly disposed between said wall portion and said one face and aligned with and fixed relative to said inlet port, a second telescoping sleeve assembly disposed between said wall portion and said one face and aligned with and fixed relative to said pressure relief port, means for resiliently urging the opposite ends of each of said sleeve assemblies into sealing engagement with said wall portion and said one face respectively, and rotating means for rotating said disc means in response to increasing fluid pressure in said chamber from a position wherein said passageway is aligned with said inlet port to a position wherein said passageway is aligned with said pressure relief port, said passageway moving through an intermediate position between said inlet port and pressure relief port wherein it is completely out of alignment with both said inlet port and said pressure relief port.

5. The subject matter as claimed in claim 4 wherein said rotating means includes means for yieldably resisting the rotation of said disc means in response to said increasing fluid pressure whereby the maximum fluid pressure at said outlet port is determined by said resisting means.

6. The subject matter as claimed in claim 4 wherein said rotating means comprises a piston extending through a wall of said body and sealed for sliding movement relative thereto, and link means connecting the end of said piston projecting within said body to said disc means whereby said piston is forced outwardly of said body by said increasing fluid pressure acting on the inner end thereof so that the outward movement of the piston rotates said disc means from said position wherein said passageway is aligned with said inlet port to said position wherein said passageway is aligned with said pressure relief port.

References Cited in the file of this patent

UNITED STATES PATENTS

| 521,315 | Hoffman | June 12, 1894 |
| 1,006,189 | Eisenbise | Oct. 17, 1911 |
| 2,166,875 | Overbeke | July 18, 1939 |
| 2,832,561 | Holl | Apr. 29, 1958 |
| 2,879,797 | Guaraldi | Mar. 31, 1959 |

FOREIGN PATENTS

| 62,860 | Germany | June 25, 1892 |